United States Patent [19]
Hayashi et al.

[11] Patent Number: 5,770,679
[45] Date of Patent: Jun. 23, 1998

[54] POLYAMIDE RESIN COMPOSITIONS AND PRODUCTION PROCESS

[75] Inventors: Ryuichi Hayashi, Tokyo; Reiko Koshida, Kanagawa, both of Japan

[73] Assignee: E. I. du Pont de Nemours and Company, Wilmington, Del.

[21] Appl. No.: 663,151
[22] PCT Filed: Dec. 16, 1993
[86] PCT No.: PCT/US93/12281
  § 371 Date: Jun. 13, 1996
  § 102(e) Date: Jun. 13, 1996
[87] PCT Pub. No.: WO95/16750
  PCT Pub. Date: Jun. 22, 1995
[51] Int. Cl.$^6$ .............................. C08L 77/06; C08L 79/08
[52] U.S. Cl. .......................... 528/310; 528/322; 528/332; 526/281; 525/66; 525/148; 525/149; 525/184; 525/210; 525/211; 524/504; 524/518; 524/522; 524/523; 524/553; 524/600; 524/606
[58] Field of Search ...................... 525/211, 210, 525/66, 178, 179, 184; 524/523, 504, 522, 518, 606, 600, 553; 526/281; 528/310, 322, 332

[56] References Cited

U.S. PATENT DOCUMENTS

| | | | |
|---|---|---|---|
| 4,614,778 | 9/1986 | Kajiura et al. | 526/281 |
| 4,918,133 | 4/1990 | Moriya et al. | 524/518 |
| 5,049,633 | 9/1991 | Sasaka et al. | 526/281 |
| 5,162,422 | 11/1992 | Lausberg et al. | 524/504 |
| 5,179,171 | 1/1993 | Minami et al. | 525/288 |
| 5,239,006 | 8/1993 | Sagane et al. | 525/211 |
| 5,304,596 | 4/1994 | Moriya et al. | 525/66 |

FOREIGN PATENT DOCUMENTS

| | | |
|---|---|---|
| 03207735 | 9/1993 | Japan . |
| 61076540 | 9/1993 | Japan . |
| WO91/18948 | 12/1991 | WIPO . |

Primary Examiner—P. Hampton-Hightower

[57] ABSTRACT

Polyamide resin compositions which are useful for molding parts with excellent malleability, thoughness, rigidity, and high heat deformation temperatures are prepared from 10 to 89% by weight of a polyamide resin, 1 to 30% by weight of at least one type of elastomer selected from among elastomers composed of ethylene/propylene/dienes, elastomers composed of ethylene/unsaturated carboxylic acid unsaturated carboxylic acid esters, and elastomers obtained by graft-modifying these elastomers, and from 10 to 60% by weight of a copolymer of ethylene and cyclic olefin that is noncrystalline and has a glass transition temperature of from 100° to 190° C.

4 Claims, No Drawings

POLYAMIDE RESIN COMPOSITIONS AND PRODUCTION PROCESS

BACKGROUND OF THE INVENTION

The utilization of polyamide resin compositions in fields such as household electronics and outer automobile parts has led to demands for compositions with improved malleability and toughness, excellent rigidity, a high heat deformation temperature, and little warping after molding.

Various methods of improving the toughness of polyamides have been proposed (British Patent No. 998,439, U.S. Pat. Nos. 3,845,163, 3,383,186, 3,465,059, 3,668,274, and Japanese Kokoku Patent No. Sho 55-44108). Among them, the polyamide resin composition disclosed in Kokoku Patent No. Sho 55-44108 is essentially composed of from 60 to 99% by weight of one phase that contains a polyamide matrix resin with a number mean molecular weight of at least 5000 and from 1 to 40% by weight of at least one other phase that contains at least one type of polymer particles selected from the group composed of branched chain and straight chain polymers, that has a particle diameter ranging from 0.01 to 1.0 micron $\mu$m, and has parts that adhere to said polyamide matrix resin. The at least one type of polymer is defined by a specific formula and has a tensile modulus ranging from approximately 1.0 to 20,000 psi (0.075–1410 kg/cm$^2$). The ratio of the tensile modulus of the polyamide matrix resin and the tensile modulus of the at least one type of polymer is higher than 10:1. The at least one type of polymer occupies at least 20% by weight of the aforementioned at least one type of other phase. The composition has improved malleability and toughness.

The rigidity is sometimes unsatisfactory in polyamide resin compositions that have improved malleability and toughness as described above. As such, polyamide resin compositions reinforced for rigidity by adding glass fibers or minerals have been used in the mentioned fields.

The specific gravity becomes too high in polyamide resin compositions reinforced by glass fibers and minerals when used in automobile wheel covers, etc. Problems also arise in terms of dimensional stability because the molded goods warp when resin compositions reinforced by glass fibers are used.

The present invention takes note of these deficiencies and has as its object to propose a polyamide resin composition with improved rigidity under high temperature and humidity, a high heat deformation temperature, and a low molding shrinkage rate while maintaining the malleability and toughness of conventional polyamide resin compositions.

SUMMARY OF THE INVENTION

The present invention relates to polyamide resin compositions exhibiting excellent malleability, toughness, and rigidity under high temperature and moisture humidity. These compositions also exhibit a low molding shrinkage rate and a high heat deformation temperature. Further, the present invention relates to a process for producing the polyamide resin compositions described herein.

The polyamide resin compositions are prepared from 10 to 89% by weight of a polyamide resin, 1 to 30% by weight of at least one type of elastomer selected from among elastomers composed of ethylene/propylene/dienes, elastomers composed of ethylene/unsaturated carboxylic acid/unsaturated carboxylic acid esters, and elastomers obtained by graft-modifying these elastomers, and from 10 to 60% by weight of a copolymer of ethylene and cyclic olefin that is noncrystalline and has a glass transition temperature of from 100° to 190° C.

DETAILED DESCRIPTION OF THE INVENTION

A first embodiment of the present invention consists essentially of
  (A) from 10 to 89% by weight of polyamide resin,
  (B) from 1 to 30% by weight of at least one elastomer selected from the group consisting of
    (a) elastomers of ethylene/propylene/dienes,
    (b) elastomers of graft-modified ethylene/propylene/dienes,
    (c) elastomers of ethylene/unsaturated carboxylic acid/unsaturated carboxylic acid esters, said elastomers having unsaturated monomers which are reactive with, and graft-modifiable to, at least one other monomer or polymer present,
    (d) elastomers of graft-modified ethylene/unsaturated carboxylic acid/unsaturated carboxylic acid esters, and
  (C) from 10 to 60% by weight of a noncrystalline polyolefin that is a copolymer of ethylene and olefin, said noncrystalline polyolefin having a cyclic structure and a glass transition temperature of from 100° to 190° C.

A second embodiment of the present invention is characterized by containing, in addition to components (A) through (C), from 0.01 to 10.0% by weight of (D) a carboxylic add or anhydrous carboxylic anhydride compound.

Polyamide resin (A) of the present invention is well known in this field and is generally called nylon. Included are semicrystalline resins and noncrystalline resins. Appropriate polyamides include those described in U.S. Pat. Nos. 2,071,250, 2,071,251, 2,130,523, 2,130,948, 2,241,322, 2,312,966, 2,512,606, and 3,393,210. Polyamide resins are manufactured by condensing equimolar quantities of saturated dicarboxylic acid having from 4 to 12 carbon atoms and diamine having from 4 to 14 carbon atoms. The polyamides may also be made having excess amine end groups rather than carboxyl end groups by using excess amine. Examples of polyamides include polyhexamethylene adipamide (nylon 66), polyhexamethylene azelamide (nylon 69), polyhexamethylene sebacamide (nylon 610), polyhexamethylene dodecanoamide (nylon 612), polyamides produced by ring opening of lactams, i.e., polycaprolactam, polyaurine lactam, poly-11-amino-undecanoic acid, and bis-(p-aminocyclohexyl)methanedodecanoamide. Polyamides produced by copolymerization of two of the aforementioned polymers or by ternary copolymerization of the aforementioned polymers or components of these, e.g., adipic acid and hexamethylenediamine isophthalate copolymers, can be used. The polyamide preferably is a linear polymer having a melting point of more than 200° C.

Regarding the compositions of the present invention, the toughness and rigidity under high temperature and humidity can be further improved by using a polyamide that has a relative viscosity (Rv) of from 16 to 45 based on JIS K-6810 using formic acid as the solvent. Specifically, the toughness is improved by adding only the elastomers used in the present invention to the polyamide. The properties drop when the Rv of the polyamide in such a system is less than 43. However, in a system with specific elastomers and noncrystalline, cyclic polyolefin added, as in the present invention, the properties conversely improve when the Rv of the polyamide resin is low (i.e., from 16 to 45). Tis is believed to be because the polyamide component combines readily with the other components.

It is possible to obtain even better properties by using a polyamide resin with a high concentration of amine end groups, particularly, an amine end group concentration of at least $60\times10^{-6}$ mol/g, preferably at least $60\times10^{-6}$ mol/g and no more than $200\times10^{-6}$ mol/g, in the present invention. The concentration of amine end groups here was measured by hydrochloric acid by dissolving the polyamide resin in phenol/methanol solution.

The composition of the present invention should contain about 10 to 89% by weight of polyamide. However, preferred compositions contain from 30 to 65% by weight of polyamide.

The composition of the present invention contains at least one is type of elastomer (B), as mentioned above. Elastomer (B) is selected from among elastomers composed of ethylene/propylene/dienes, elastomers of ethylene/ unsaturated carboxylic acid/unsaturated carboxylic acid esters having unsaturated monomers which are reactive with, and graft-modifiable to, at least one other monomer or polymer present, or graft-modified elastomers obtained from any of these. It is preferable to use an elastomer composed essentially of ethylene/propylene/dienes modified by carboxylic acid or carboxylic anhydride or an elastomer composed primarily of ethylene/acrylate/methacrylate/ unsaturated epoxide.

Examples of elastomers composed essentially of ethylene/propylene/dienes modified by carboxylic acid or carboxylic anhydride include ethylene/propylene/1,4-hexadiene-g-maleic anhydride, mixtures of ethylene/propylene/1,4-hexadiene and ethylene/propylene/1,4-hexadiene-g-maleic anhydride, ethylene/propylene/1,4-hexadiene-g-fumarate, ethylene/propylene/1,4-hexadiene/norbornadiene-g-fumarate, mixtures of ethylene/propylene/1,4-hexadiene and ethylene/maleic anhydride monoethyl ester, mixtures of ethylene/propylene/1,4-hexadiene and ethylene/monobutyl maleate, and mixtures of ethylene/propylene/1,4-hexadiene and ethylene/maleic anhydride.

Examples of elastomers composed primarily of ethylene/acrylate/methacrylate/unsaturated epoxide include ethylene/methyl acrylate/glycidyl methacrylate, ethylene/butyl acrylate/glycidyl methacrylate, and ethylene/methyl methacrylate/glycidyl acrylate.

The present invention should contain about 1 to 30% by weight of the composition of at least one elastomer selected from the elastomers described above as elastomer (B).

The composition of the present invention further contains (C) a noncrystalline polyolefin which is a copolymer of ethylene and olefin, said noncrystalline polyolefin having a cyclic structure and a glass transition temperature of from 100° to 190° C. Such a noncrystalline, cyclic polyolefin (C) can be produced, for example, by using a Ziegler-Natta catalyst. Examples of commercial products include Mitsui Petrochemical Industry's cyclic olefin copolymer APEL®.

The composition of the present invention contains from 10 to 60% by weight of said noncrystalline, cyclic polyolefin.

As mentioned above, a second embodiment of the present invention has, in addition to components (A)–(C), a carboxylic acid or carboxylic anhydride compound added to obtain even better toughness and rigidity. Said carboxylic acid or carboxylic anhydride compound reacts with the elastomer or noncrystalline, cyclic polyolefin contained in the composition of the present invention to form acid anhydride bonded to the ends of these. These further bond to the ends of the polyamide, making it possible to form a desirable composition.

In the compositions of the present invention, the toughness cannot be sufficiently strengthened when elastomer (B) is present in an amount above or below the aforementioned range. Furthermore, the flexural modulus of elasticity becomes low and the elasticity excessive, both of which are undesirable, when the amount of elastomer (B) exceeds the aforementioned range.

Strengthening of the rigidity under high temperature and humidity is insufficient when the noncrystalline, cyclic polyolefin (C) is present in an amount above or below the aforementioned range.

Furthermore, the heat resistance drops and it becomes difficult to obtain a good composition from a process standpoint, both of which are undesirable, when the amount of the noncrystalline, cyclic polyolefin (C) exceeds the aforementioned range.

The composition of the present invention may be modified by one or more types of conventional additives, e.g., stabilizers and inhibitors of deterioration by oxidation, heat, and ultraviolet rays, lubricants and mold release agents, coloring agents, including dyes and pigments, fibrous and granular fillers and reinforcing agents, nucleating agents, and plasticizers, within a range that does not interfere with attaining the stated goals.

Stabilizers can be introduced into the composition at any stage in the manufacture of the composition. Stabilizers are preferably added to eliminate the beginning of deterioration that occurs before the composition is protected. Such stabilizers must be compatible with the composition.

Oxidation stabilizers and heat stabilizers which are useful in the composition of the present invention include those generally used in polymers. These include up to 1% by weight, based on the weight of the polyamide, of group 1 metal halides, e.g., halides of sodium, potassium, and lithium, cuprous halides, e.g., chloride, bromide, and iodide, sterically hindered phenol, hydroquinone, substituted derivatives of this group, and combinations thereof.

Ultraviolet stabilizers generally used in polymers may be added to the compositions of the present invention in an amount up to 2.0% based on the weight of the polyamide. Examples of such ultraviolet stabilizers include various substituted reorcinols, salicylates, benzotriazoles, and benzophenones.

Lubricants and mold release agents may be added to the compositions of the present invention in amounts up to 1.0% based on the weight of the composition. Appropriate lubricants and mold release agents include stearic acid, stearyl alcohol, and stearamide.

Organic dyes which may be useful in the compositions of the present invention include nitrosine. Pigments include titanium dioxide, phthalocyanine, ultramarine blue, and carbon black.

Fibrous and particulate fillers and reinforcing agents include carbon fibers, glass fibers, amorphous silica, asbestos, calcium silicate, aluminum silicate, magnesium carbonate, kaolin, chalk, powdered quartz mica, and feldspar. These may be combined in quantities of up to 50% based on the weight of the composition. However, they must be used to an extent that does not interfere with obtaining the stated goals.

Nucleating agents include talc, calcium fluoride, sodium phenyl phosphinate, alumnina, and powdered polytetrafluoroethylene. Plasticizers that can be combined in a quantity of up to approximately 20% based on the weight of the composition include dioctyl phthalate, dibenzyl phthalate, butylbenzyl phthalate, hydrocarbon oil, N-n-butylbenzenesulfonamide and o- and p-toluene-ethylsulfonamide. Coloring agents (dyes and pigments) can be present in a quantity of up to approximately 5.0% by weight based on the weight of the composition.

The polyamide resin compositions of the present invention can be produced by known methods. Examples of the method of producing the first embodiment of the present invention include (1) mechanically blending all components (A–C) in an extruder or kneader, (2) removing the solvent after dissolving all of the components simultaneously or separately in appropriate solvents and mixing, and (c) combinations of (1) and (2) above.

The following is an example of a process for producing the second embodiment of the present invention. In the first stage, elastomer (B), noncrystalline, cyclic polyolefin (C), and carboxylic acid or carboxylic anhydride compound (D) are mechanically blended in an extruder or kneader. Alternatively, components (B)–(D) are dissolved simultaneously or separately in appropriate solvents, mixed, and the solvents removed. In the second stage, the pellets obtained in the first stage are mechanically blended with polyamide resin (A) in an extruder or kneader. Alternatively, the solvent is removed after dissolving each of these components simultaneously or separately in appropriate solvents and mixing.

The desired properties cannot be obtained using the method above because of the increase in the heating history of the resin since such methods require a double kneading operation. The complex operation if; relatively expensive and time consuming.

Therefore, it is preferable to use the process that follows to produce the second embodiment of the present invention. The elastomer and polyolefin are graft modified by supplying elastomer (B), polyolefin (C), and carboxylic acid or carboxylic anhydride compound (D) to the first kneading zone under a mean shear speed of at least 50 $\sec^{-1}$ in the kneading operation using an extruder that has a first kneading zone upstream and a second kneading zone downstream. Polyamide resin (A) is next supplied to the aforementioned second kneading zone where said polyamide resin (A) and the aforementioned graft-modified elastomer and polyolefin are kneaded together. The heating history is decreased so that a polyamide resin composition with excellent malleability, toughness, and rigidity under high temperature and humidity can be produced because the target polyamide resin composition is manufactured by one kneading operation alone in such a production method.

The elastomer (B), noncrystalline, cyclic polyolefin (C), and carboxylic acid or carboxylic anhydride compound (D) supplied to the first kneading zone in this production method may be premixed all together or in an arbitrary combination before supply or may each be independently melted and injected. An organic peroxide may be added as a reaction initiator in the first zone. The amount of organic peroxide is preferably no more than 3% in relation to the total weight of elastomer (B) and noncrystalline, cyclic polyolefin (C) because it causes deterioration of the resin.

The screw rotations of the extruder must be controlled so that the mean shear speed in the kneading operation is at least 50 $\sec^{-1}$, preferably from 50 to 150 $\sec^{-1}$, to efficiently graft modify the elastomer (B) and noncrystalline, cyclic polyolefin (C) with the carboxylic acid or carboxylic anhydride compound (D). In this production method, excellent properties can be obtained by appropriately dispersing the modified elastomer (B) and noncrystalline, cyclic polyolefin (C) in the polyamide resin. When the mean shear speed is slower than 50 $\sec^{-1}$, excellent properties are not manifested because the elastomer is insufficiently dispersed in the polyamide. Furthermore, when the mean shear speed is faster than 150 $\sec^{-1}$, the anticipated properties are not obtained due to deterioration of the kneaded resin.

It is preferable to use an extruder (including extruders having two or more axes) with first and second zones equipped with the respective supply ports and vents for the first and second kneading zones in the process above. A vent is provided in the first zone to remove excess reaction raw materials. The temperature of the first zone is no more than 50° C. from the supply port until reaching the kneading zone. The temperature of the first kneading zone is from 30° to 150° C. higher than 100°–190° C. which is the glass transition temperature of the noncrystalline, cyclic polyolefin, preferably from 50° to 100° C. higher than 100°–190° C. The temperature of the second zone is from 10° to 60° C. higher than the melting point of the polyamide resin, preferably 25° to 50° C. higher than the melting point. Furthermore, the temperature is established so as to obtain the appropriate extrusion pressure at the end of the extruder. The vent provided in the first zone is suctioned to more than 400 torr, preferably no more than 200 torr, more preferably no more than 100 torr. The vent provided in the second zone is suctioned to no more than 100 torr, preferably no more than 60 torr.

The polyamide resin compositions of the present invention explained above, especially the polyamide resin composition produced by a single kneading procedure using the manufacturing process described above, have excellent malleability, toughness, and rigidity under high temperature and humidity, a high heat deformation temperature, and make it possible to obtain precision molded goods. For example, when outer shell parts of automobiles such as wheel covers and fenders are molded using the composition of the present invention, problems of dimensional stability such as warping and problems such as excessive specific gravity can be eliminated together with obtaining excellent malleability, toughness, and rigidity.

Molded goods may be obtained from the compositions of the present invention in accordance with conventional methods used for known polyamide resin compositions.

EXAMPLES

The present invention is illustrated in the examples that follow. It should be understood that the invention is not limited to the embodiments exemplified herein. In the examples below, the resins used were as follows:

"Polyamide A": nylon 66 made by DuPont, Rv=43, amine end group concentration −47.6×10−6 mol/g.

"Polyamide B": nylon 66 made by DuPont, Rv=25, amine end group concentration=161.0×$10^{-6}$ mol/g.

"Polyamide C": nylon 66 made by DuPont, Rv=52.

Noncrystalline, cyclic polyolefin: APEL® 150R made by Mitsui Petrochemical Industry.

Modified EPDM (ethylene-propylene-diene-monomer) rubber: made by DuPont.

Modified ethylene acrylate rubber: made by DuPont.

Maleic anhydride: special grade reagent made by Kanto Chemical or crystal MAN made by Japan Fats and Oils.

For the composition of Examples 1 to 6 and Comparative Examples 1 to 4, all components, except for the polyamide resins, were melted and kneaded in a biaxial extruder (Toshiba TEM35), cooled in water, and made into pellets. The pellets obtained and the polyamide resins were then melted and kneaded in a biaxial extruder (Toshiba TEM35), cooled in water, and made into pellets.

For examples 7 and 8 and Comparative Examples 5 and 6, a biaxial extruder (made by The Japan Steel Worms TEX44; L/D=45.5) having first and second zones equipped with the respective supply regions and vents for the first and second kneading zones was used. The temperatures of the first zones were set at 5° C. immediately beneath the supply port and 250° C. in the first kneading zone. The temperature of the second zone was set at 290° C. immediately below the supply zone and in the second kneading zone. The temperature at the end of the extruder was set at 285° C.

The screw rotations were established as shown in Table 5 and the noncrystalline, cyclic polyolefin, EPDM rubber, maleic anhydride, and diluted organic peroxide shown in Tables 1 and 2 were premixed and supplied from the supply port for the first zone. "Polyamide A", as shown in Tables 1 and 2, was then supplied from the second zone, kneaded, and extruded. After water cooling the ejected resin, resin pellets were produced by passing the resin through a cutter.

For Comparative Example 7, the noncrystalline, cyclic polyolefin, EPDM rubber, maleic anhydride, and diluted organic peroxide compound shown in Tables 1 and 2 were melted and kneaded by a biaxial extruder (Toshiba TEM35) set at a temperature of 250° C. and screw rotations of 150 rpm. Pellets were produced after water cooling. Approximately, 55% by weight of the pellets obtained and "Polyamide A" (45% by weight) were melted and kneaded in a biaxial extruder (Toshiba TEM35) set at a temperature of 280° C. and screw rotations of 250 rpm. Resin pellets were produced after water cooling.

The respective resin pellets from each Example above were molded into 13 mm×3.2 mm test pieces based on ASTM D-638 in an injection molding machine (Toshiba TEM35). The retention time was set at 5–6 min, the barrel temperature at 270°–280° C., and the nozzle temperature at 280°–290° C. Molding was conducted with a mold temperature of approximately 90° C. and 10/20 or 20/20 molding cycle (seconds of ram forward movement/second of retention). The properties of the molded goods were measured immediately after molding and in a state of equilibrium water absorption at 50% RH. The property values were measured using the following test methods:

Tensile strength: ASM D-1638-58%

Elongation: ASIM D-38-58%

Flexural modulus of elasticity: ASTM D-790-58T

Notched Izod: ASTM D-356-56

Heat deformation temperature: ASITM D-648

For the molding shrinkage rate, the resin pellets obtained were molded into 3 inch×5 inch×⅛ inch (7;62 cm×12.7 cm×0.32 cm) sheets and the molding shrinkage rate measured.

The properties for examples 1 to 6 and Comparative Examples 1 to 4 are shown in Tables 3 and 4. The properties for Examples 7 and 8 and Comparative Examples 5, 6 and 7 are shown in Table 5.

TABLE 1

| Components (% by weight) | Example 1 | Example 2 | Example 3 | Example 4 | Example 5 | Example 6 | Example 7 | Example 8 |
|---|---|---|---|---|---|---|---|---|
| Polyamide 66A | 45.00 | 45.00 | 45.00 | | | | 45.00 | 45.00 |
| Polyamide 66B | | | | 45.00 | 45.00 | 45.00 | | |
| Noncrystalline, cyclic polyolefin | 40.00 | 38.50 | 40.00 | 40.00 | 38.50 | 38.50 | 40.92 | 40.92 |
| Modified EPDM rubber | 15.00 | 16.50 | | 15.00 | 16.50 | 16.22 | 12.32 | 12.32 |
| Modified ethylene acrylate rubber | | | 15.00 | | | | | |
| Maleic anhydride | | | | | | 0.28 | 0.66 | 0.66 |
| Diluted organic peroxide | | | | | | | 1.1 | 1.1 |

TABLE 2

| Components (% by weight) | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Polyamide 66A | 45.00 | | | | 45.00 | 45.00 | 45.00 |
| Polyamide 66B | | 45.00 | | | | | |
| Polyamide 66C | | | 80.00 | 100.00 | | | |
| Noncrystalline cyclic polyolefin | 53.35 | 53.35 | | | 40.92 | 40.92 | 40.92 |
| Modified EPDM rubber | | | 20.00 | | 12.32 | 12.32 | 12.32 |
| Modified ethylene acrylate rubber | | | | | | | |
| Maleic anhydride | 1.65 | 1.65 | | | 0.66 | 0.66 | 0.66 |
| Diluted organic peroxide | | | | | 1.1 | 1.1 | 1.1 |

TABLE 3

| Property measured | Example 1 | Example 2 | Example 3 | Example 4 | Example 5 | Example 6 |
|---|---|---|---|---|---|---|
| Tensile strength (kg/cm²) | 371.80 | 379.02 | 408.34 | 310.61 | 402.64 | 433.64 |
| Elongation (%) | 7.74 | 22.91 | 8.45 | 12.99 | 41.12 | 76.19 |
| Flexural modulus of elasticity (1000 kg/cm²) | 16.59 | 14.79 | 8.45 | 12.99 | 41.12 | 76.19 |
| Flexural modulus of elasticity (at | 13.2 | 11.9 | 14.0 | 13.1 | 12.8 | 12.5 |

TABLE 3-continued

| Property measured | Example 1 | Example 2 | Example 3 | Example 4 | Example 5 | Example 6 |
|---|---|---|---|---|---|---|
| 50% water absorption equilibrium) (1000 kg/cm$^2$) | | | | | | |
| Notched Izod at 23° C. (impact strength) (kg.cm/cm) | 3.34 | 8.62 | 4.45 | 6.786 | 14.92 | 40.34 |
| Notched Izod at −30° C. (impact strength) (kg.cm/cm) | | 4.10 | | 4.50 | 7.7 | 13.7 |
| Molding shrinkage rate (%) (in flow direction) | 1.40 | 1.38 | 1.39 | 1.40 | 1.38 | 1.40 |
| Molding shrinkage rate (%) (perpendicular to flow direction) | 1.31 | 1.32 | 1.32 | 1.32 | 1.32 | 1.32 |
| Heat deformation temperature at 4.5 kg/cm$^2$ (°C.) | 164 | 163 | 165 | 167 | 165 | 168 |
| Heat deformation temperature at 18.5 kg/cm$^2$ (°C.) | 142 | 141 | 145 | 143 | 143 | 142 |
| Specific gravity | 1.04 | 1.04 | 1.04 | 1.04 | 1.04 | 1.04 |

TABLE 4

| Property measured | Comparative Example 1 | Comparative Example 2 | Comparative Example 3 | Comparative Example 4 |
|---|---|---|---|---|
| Tensile strength (kg/cm$^2$) | 591.51 | 584.24 | 527 | 844 |
| Elongation (%) | 3.81 | 4.54 | 60 | 50 |
| Flexural modulus of elasticity (1000 kg/cm$^2$) | 26.85 | 26.68 | 17.20 | 28.8 |
| Flexural modulus of elasticity (at 50% water absorption equilibrium) (1000 kg/cm$^2$) | 18.4 | 17.8 | 8.8 | 12.3 |
| Notched Izod at 23° C. (impact strength) (kg.cm/cm) | 3.66 | 4.92 | 92.5 | 5.4 |
| Notched Izod at −30° C. (impact strength) (kg.cm/cm) | 1.38 | 1.40 | 1.0 | 0.6 |
| Molding shrinkage rate (%) (in flow direction) | 1.31 | 1.32 | 1.5 | 1.6 |
| Molding shrinkage rate (%) (perpendicular to flow direction) | 1.31 | 1.32 | 1.5 | 1.6 |
| Heat deformation temperature at 4.5 kg/cm$^2$ (°C.) | 168 | 169 | 216 | 235 |
| Heat deformation temperature at 18.5 kg/cm$^2$ (°C.) | 150 | 152 | 71 | 90 |
| Specific gravity | 1.04 | 1.04 | 1.08 | 1.04 |

TABLE 5

| Property measured | Example 7 | Example 8 | Comparative Example 5 | Comparative Example 6 | Comparative Example 7 |
|---|---|---|---|---|---|
| Screw rotations (rpm) | 200 | 250 | 120 | 150 | 150/250 |
| Mean shear speed (S$^{-1}$) | 56 | 70 | 34 | 42 | |
| Tensile strength (kg/cm$^2$) | 498 | 496 | 518 | 515 | 460 |
| Elongation (%) | 47 | 44 | 26 | 25 | 43 |
| Flexural modulus of elasticity (1000 kg/cm$^2$) | 20.2 | 19.8 | 20.5 | 20.8 | 20.6 |
| Flexural modulus of elasticity (at 50% water absorption equilibrium) (1000 kg/cm$^2$) | 14.1 | 13.7 | 14.0 | 14.2 | 13.0 |
| Notched Izod at 23° C. (impact strength) | 67 | 64 | 19 | 25 | 21 |
| Notched Izod at −30° C. (impact strength) | 10 | 10 | 7.0 | 7.5 | 9.5 |
| Heat deformation temperature at 4.5 kg/cm$^2$ (°C.) | 159 | 155 | 160 | 162 | 164 |
| Heat deformation temperature at 18.5 kg/cm$^2$ (°C.) | 133 | 128 | 71 | 90 | 136 |

As shown in Tables 3 and 4, the compositions of Examples 1 to 6 had a lower molding shrinkage rate, little isotropy, and little warping while maintaining a better balance of toughness (refer especially to the elongation and notched Izod) and rigidity (refer especially to the flexural modulus of elasticity) than in Comparative Examples 3 and 4. The heat deformation temperature was also high under an 18.5 kg/cm$^2$ load, showing improvement of the high temperature rigidity. The elongation and notched Izod were also improved in comparison to Comparative Examples 1 and 2 which did not contain a rubber component.

In Examples 4, 5 and 6, which used "Polyamide B" having a low relative viscosity and high amine end group concentration, the elongation and notched Izod were further improved (even in comparison to Examples 1 and 2). In Example 6, in which maleic anhydride was added, the elongation and notched Izod were even further improved in comparison to Examples 4 and 5.

As shown in Table 5, the compositions of Examples 7 and 8, produced by a single kneading procedure, had especially improved elongation and notched Izod in comparison to Comparative Examples 5 and 6 (where the mean shear speed was slow in the single kneading procedure) and Comparative Example 7 (in which the composition was produced by, a double kneading procedure).

What is claimed is:

1. A polyamide resin composition consisting essentially of
   (A) from 10 to 89% by weight of a polyamide resin having an amine end group concentration of $60 \times 10^{-6}$ to $200 \times 10^{-6}$ mol/g,
   (B) from 1 to 30% by weight of at least one elastomer selected from the group consisting of
      (a) elastomers of ethylene/propylene/dienes,
      (b) elastomers of ethylene/propylene/dienes graft-modified by a carboxylic acid or carboxylic anhydride,
      (c) elastomers of ethylene/unsaturated carboxylic acid/ unsaturated carboxylic acid esters, said elastomers having unsaturated monomers which are reactable to polyamide and
      (d) elastomers of ethylene/unsaturated carboxylic acid/ unsaturated carboxylic acid esters graft-modified by unsaturated epoxide; and
   (C) from 10 to 60% of a polyolefin that is a copolymer of ethylene and olefin, said polyolefin being noncrystalline and having a cyclic structure and a glass transition temperature from about 100° to about 190° C.

2. A polyamide resin composition as in claim 1 further containing (D) from 0.01 to 10.0% by weight of a carboxylic acid or carboxylic anhydride compound.

3. A process for producing a polyamide resin composition comprising extrusion molding the polyamide resin composition of claim 2 in an extruder having a first kneading zone upstream and a second kneading zone downstream wherein the elastomer of (B), the polyolefin of (C) and the carboxylic acid or carboxylic anhydride compound of (D) are supplied to said first kneading zone under a mean shear speed of at least 50 sec$^{-1}$, said elastomer and polyolefin thereby being graft-modified; and wherein the polyamide resin of (A) is supplied to said second kneading zone such that said polyamide resin and said graft-modified elastomer and polyolefin are kneaded together in said second kneading zone.

4. Molded parts for automobiles prepared from the compositions of claim 1 or claim 2.

* * * * *